United States Patent [19]
Webb et al.

[11] Patent Number: 6,040,838
[45] Date of Patent: Mar. 21, 2000

[54] GRAPHIC STATE PROCESSING

[75] Inventors: Richard D. Webb, Sunnyvale; Ryoji Watanabe, Cupertino, both of Calif.

[73] Assignee: Obejct Technology Licensing Corporation, Cupertino, Calif.

[21] Appl. No.: 08/148,052

[22] Filed: Nov. 5, 1993

[51] Int. Cl.⁷ .................................................. G06F 15/00
[52] U.S. Cl. ............................................................ 345/433
[58] Field of Search .................................. 345/433, 435, 345/440, 441, 113, 114

[56] References Cited

U.S. PATENT DOCUMENTS

| | | | |
|---|---|---|---|
| 4,821,220 | 4/1989 | Duisberg | 364/578 |
| 4,845,651 | 7/1989 | Aizawa et al. | 382/285 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplion et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,675,720 | 10/1997 | Sato et al. | 345/420 |

*Primary Examiner*—Phu K. Nguyen
*Attorney, Agent, or Firm*—Kudirka & Jobse LLP

[57] ABSTRACT

A method and system for graphic state processing in which a graphic state object separate from a graphic contains state information. The state object can be accessed during times other than drawing. The object is comprised of sub-states which represent particular graphic processing states. A graphic need only send the graphic hierarchy, and the graphic state object automatically takes care of the sending of the graphic states to the rendering device. The graphic state object is an entity separate from the graphic which is to be drawn.

47 Claims, 8 Drawing Sheets

GRAPHIC STATE PROCESSING

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This patent application is related to the patent application entitled OBJECT ORIENTED GRAPHIC SYSTEM, filed Nov. 3, 1993 and assigned to Taligent, the disclosure of which is hereby incorporated by reference.

1. Field of the Invention

This invention generally relates to improvements in computer systems, and more particularly to a system and method of graphic state processing.

2. Background of the Invention

In previous graphics architecture, a graphic typically stores its state (such as color, transfer mode, clip area, etc.) privately. When asked to draw, the graphic procedurally copies these state variables into a GrafPort, where they are accessed by the rendering code. Thus, the graphic's state is available only during this explicit drawing operation. This is not object-oriented, and is a restriction a graphic system cannot afford to make.

Another problem with prior art graphics architecture is that of constraining the graphic hierarchy in a graphic object because of the object which is to interact with the graphic in drawing the graphic.

SUMMARY OF THE INVENTION

Accordingly, it is a primary object of the present invention to provide a system and method for processing graphic state.

It is another object of the primary object of the present invention to provide a system and method for providing access to graphic state separate from a graphic which may use the graphic state.

These and other objects of the present invention are realized by a method and system having a graphic state object which is used by a graphic to render the graphic. The graphic state object may also include the ability to establish relationships with the rendering device and an associated cache. Furthermore, the state object includes numerous sub-states.

DETAILED DESCRIPTION OF THE INVENTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The history of object-oriented programming and the developments of frameworks is well-established in the literature. C++ and Smalltalk have been well-documented and will not be detailed here. Similarly, characteristics of objects, such as encapsulation, polymorphism and inheritance have been discussed at length in the literature and patents. For an excellent survey of object oriented systems, the reader is referred to "Object Oriented Design With Applications" by Grady Booch.

While many object oriented systems are designed to operate on top of a basic operating system performing rudimentary input and output, the present system is used to provide system level support for particular features.

Figure 1:
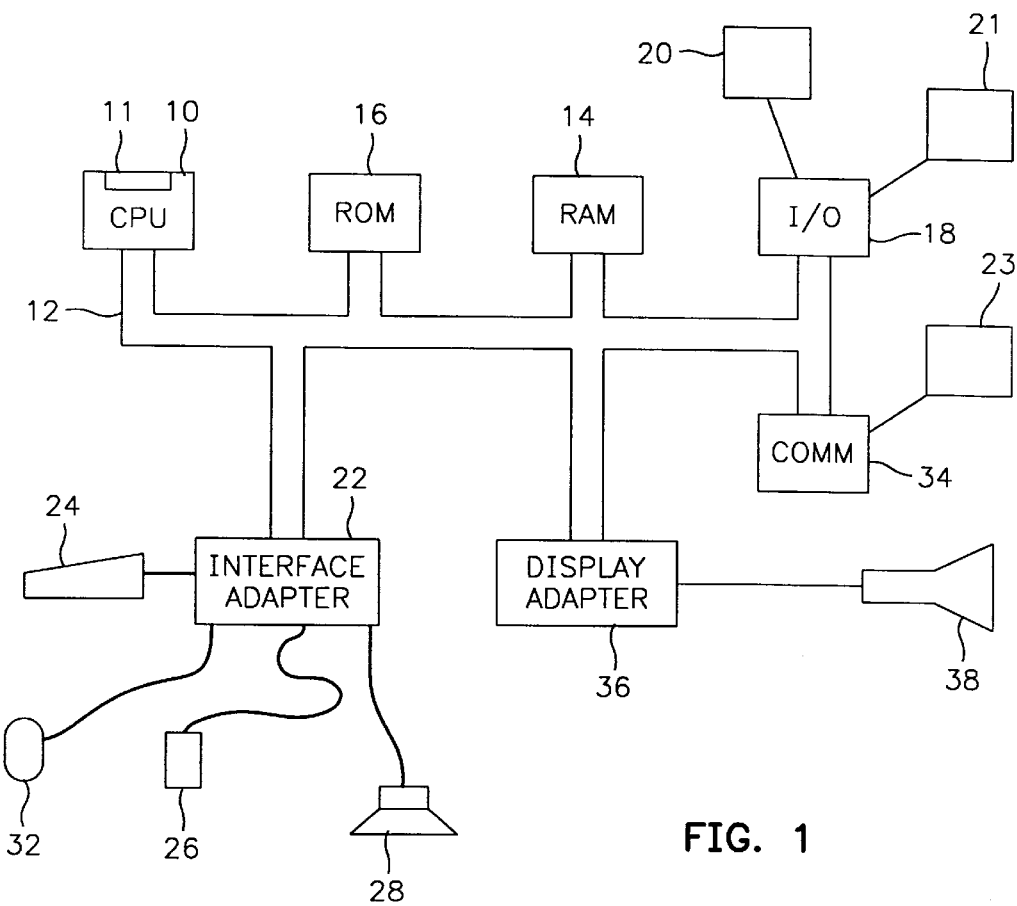
FIG. 1 illustrates a typical hardware configuration of a computer in accordance with the subject invention.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 100, such as a conventional microprocessor, and a number of other units interconnected via a system bus 132. The computer shown in FIG. 1 includes a Read Only Memory (ROM) 104, a Random Access Memory (RAM) 106, an I/O adapter 112 for connecting peripheral devices such as disk units 108 and other I/O peripherals represented by 110 to the system bus 132, a user interface adapter 128 for connecting a keyboard 130, a mouse 126, a speaker 122, a microphone 124, and/or other user interface devices such as a touch screen device (not shown) to the bus, a communication adapter 116 for connecting the workstation to a data processing network represented by 114. A display adapter 120 for connecting the bus to a display device 118. The workstation has resident thereon an operating system such as the Apple System/7® operating system.

Definitions

Graphic State—All the graphical state variables (sometimes called attributes) needed to draw a geometry, including the paint, transfer mode, pen geometry, matrix, clip area, etc.

Graphic Hierarchy—A hierarchical arrangement of graphical primitives in which graphic state, such as the coordinate system and clipping information, can be inherited from a parent graphic to a child graphic.

GrafPort—A container of the complete set of graphic state, a device, and a device cache.

The disclosed graphic state processing system achieves many goals which will raise the overall efficiency of graphics processing applications. One of the goals is to support an abstract base class that represents the collection of all graphic state and to support hierarchical behavior (concatenation) of the state. Subclasses provide specific implementations for the storage and concatenation of the state variables. Another goal is to require that concatenation of a child graphic's state to a parent's state must be isolated in the child. The parent's state must not be affected by the concatenation. In addition, the child has the last word in deciding the ultimate value of a variable. Thus, the parent cannot dictate the value of a variable.

It is also a goal that the graphic state can easily be communicated to a TGrafDevice object. Yet another goal is to support a framework that allows the graphic state to be accessed outside the context of a graphic's Draw call. For example, sprites may need access to a graphic state object in order to draw into views. Another goal is to not bake any assumptions about graphic hierarchies into the TGrafDevice class. A graphic hierarchy is naturally implemented within the graphic itself. Thus, no particular design is forced on the hierarchy by TGrafDevice.

And finally, another goal is to make all device-dependent data types private to the device. For instance, all clipping is specified by TGAreas, not regions.

As discussed in the background of the invention, in previous graphics architectures a graphic typically stores its state (such as color, transfer mode, clip area, etc.) privately. When asked to draw, the graphic procedurally copies these state variables into a GrafPort, where they are accessed by the rendering code. Thus, the graphic's state is available only during this explicit drawing operation. The present system provides a framework for a graphic to store its state. The framework supports an architecture in which clients can get access to the graphic state outside the context of the "draw" function. It would allow the set of graphic state to be expressed by a single object instead of a sequence of code. This is the purpose of the TGrafPort class. It is an abstract class that defines the interface for accessing the state variables. Concrete subclasses define the actual storage and concatenation behavior of the state variables.

The old way:
```
{
  port.Pusl-Matrix ( );
  port.ConcatenateMatrix (myMatrix);
  port.Draw (myRectangle);
  port.PopMatrix ( );
}
```
The new way:
```
{
  TMatrixConcatenatorPort port (basePort, myMatrix);
  port.Draw (myRectangle);
}
```

TGrafState & TGrafPort

Figure 2:
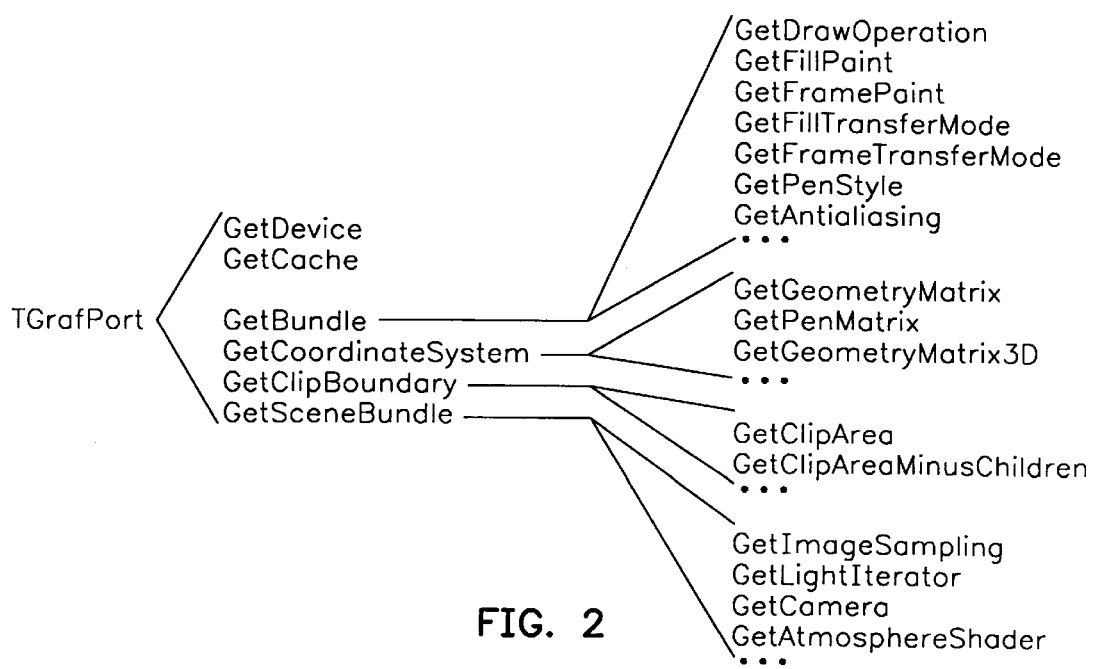
FIG. 2 conveys the overall structure of the TGrafState.

FIG. 2 conveys the overall structure of the TGrafState. The structure involves grouping all the graphic state into six different groups, which then are grouped into a single class called TGrafState 200. The six "sub-states" 202 are TAttributeState (the collection of attributes that determine the appearance of graphics), two TMatrixStates (2D view and model coordinate systems), TClipState (2D clipping information), TSceneState (3D camera and lights), and TMatrix3DState (3D model coordinate system). A TGrafState object 200 is used by classes that need access to the full graphic state. Additionally, due to the abstract design of the TGrafState class, a child graphic's state can be concatenated with its parent's state without actually changing the parent's state.

It should be noted that FIG. 2 is not exhaustive. The six sub-states shown could be more than six, or less if such a design was more desirable. Furthermore, the elements which are shown to make up the six sub-states are not exhaustive. For example, the attributes could include virtually any graphics attribute which is known in graphics processing.

Also shown in FIG. 2 are the exemplary elements 204 of the six sub-states 202 outlined above. In particular, GetAttributeState has GetDrawOperation, GetFillPaint, GetFramePaint and GetAntialiasing; GetViewMatrixState has GetMatrix; GetModelMatrix has GetMatrix; GetClipState has GetClipArea; GetSceneState has CreateLightIterator and GetCamera; and GetModelMatrix3DState has GetMatrix. Again, these elements which comprise the sub-states are merely examples, and may include many more than shown and discussed.

Figure 3:
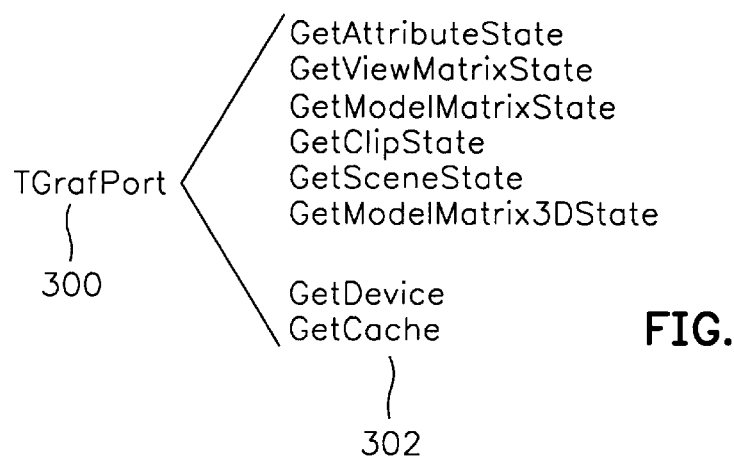
FIG. 3 is a diagram showing TGrafPort adding methods to access a device and a device cache.

The TGrafPort class is a subclass of TGrafState. As shown in FIG. 3, TGrafPort 300 adds methods 302 to access a device and a device cache. GetDevice returns a pointer to the device to which rendering is done. GetCache returns a pointer to the cache used by the device to cache device-dependent objects. TGrafPort also includes the six sub-states.

The main purpose for subclassing TGrafPort 300, which includes the six sub-states, is to define how storage and concatenation of the graphic state, device, and device cache is done. The sub-states assist in splitting the state variables into commonly used groups. A simpler, flat group of state variables would not be flexible enough to allow customization of state concatenation for a subset of the state variables. For instance, a simple graphic typically needs only a TGrafBundle (a convenient TAttributeState subclass); more complex graphic objects may need a matrix and possibly a clip area. See the Sub-States section for more information on these classes.

Figure 4:
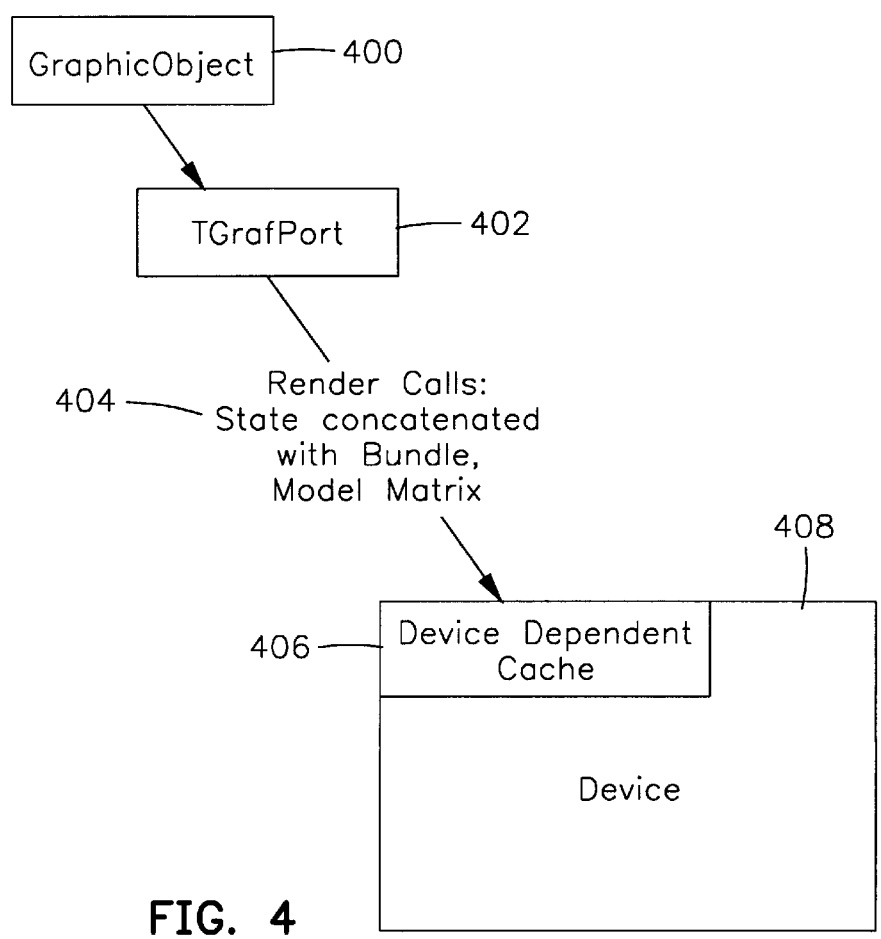
FIG. 4 is a diagram showing TGrafPort allowing a graphic object to conveniently "dump" its contents into a TGrafDevice object.

A graphics class such as MGraphic must describe itself to a TGrafDevice in terms of the basic set of geometries, and each geometry must have a set of TGrafState objects associated with it (not necessarily a unique one). As shown in FIG. 4, the TGraffort 402 allows a graphic object 400 to conveniently "dump" its contents into a TGrafDevice object. This is accomplished by supplying a set of Draw functions in the TGrafPort class that mirror the set of Render functions present in the TGrafDevice class. Each Draw function takes a geometry and passes it and the port's graphic state 404 to the appropriate Render call in the device 408. For convenience, an overriding bundle and model matrix can also be passed in 404.

The TGrafPort class is shown below:
```
class TGrafPort {
public:
   virtual~TGrafPort ( );
```
This is the destructor.
```
   virtual TGrafDevice* GetDevice ( ) const=0;
```
This function returns the device that the TGrafPort is drawing to.

virtual TGrafCache* GetCache ( ) const=0;

This function returns the device-dependent cache that the TGrafPort uses when it makes Render calls to the device.

virtual const TAttributeState* GetAttributeState ( ) const=0;

This function returns a pointer to a TAttributeState object.
    virtual const TMatrixState* GetViewMatrixState ( )=0;

This function returns a pointer to a matrix state object to be used as the 2D view coordinate system.
    virtual const TMatrixState* GetModelMatrixState ( )=0;

This function returns a pointer to a matrix state object to be used as the 2D model coordinate system.
    virtual const TClipState* GetClipState ( ) const=0;

This function returns a pointer to a clip state object.
    virtual const TSceneState* GetSceneState ( ) const=0;

This function returns a pointer to a scene state object.
    virtual const TMatrix3DState* GetModelMatrix3DState ( )=0;

This function returns a pointer to a 3D matrix state object to be used as the 3D model coordinate system.
    void Draw (const TGLine& line) const;
    void Draw (const TGPolyline& polyline) const;
    void Draw (const TGCurve& curve) const;
    void Draw (const TGRect& rect) const;
    void Draw (const TGEllipse& ellipse) const;
    void Draw (const TGPolygon& polygon) const;
    void Draw (const TGLoop& loop) const;
    void Draw (const TGGlyphRun& glyphRun) const;
    void Draw (const TGArea& area) const;
    void Draw (const TGImage& image, const TGRect& source, const TGRect& destination) const;

These are the 2D Draw calls. They exist solely for convenience. They call the corresponding TGrafDevice::Render call, passing in the graphic state and device cache.

The purpose for the large number of disjoint calls (as opposed to a polymorphic single call) is to enforce the rule that only a small, well-defined set of basic 2D geometries is supported by graphics devices.

void Draw (
        const TGLine& line,
        const TGrafBundle& bundle,
        const TGrafMatrix& modelMatrix=TGrafMatrix::GetIdentity( )) const;
    void Draw (
        const TGPolyline& polyline,
        const TGrafBundle& bundle,
        const TGrafMatrix& modelMatrix=TGrafMatrix::GetIdentity( )) const;
    void Draw (
        const TGCurve& curve,
        const TGrafBundle& bundle,
        const TGrafMatrix& modelMatrix=TGrafMatrix::GetIdentity( )) const;
    void Draw (
        const TGRect& rect,
        const TGrafBundle& bundle,
        const TGrafMatrix& modelMatrix=TGrafMatrix::GetIdentity( )) const;
    void Draw (
        const TGEllipse& ellipse,
        const TGrafBundle& bundle,
        const TGrafMatrix& modelMatrix=TGrafMatrix::GetIdentity( )) const;
    void Draw (
        const TGPolygon& polygon,
        const TGrafBundle& bundle,
        const TGrafMatrix& modelMatrix=TGrafMatrix::GetIdentity( )) const;
    void Draw (
        const TGLoop& loop,
        const TGrafBundle& bundle,
        const TGrafMatrix& modelMatrix=TGrafMatrix::GetIdentity( )) const;
    void Draw (
        const TGGlyphRun& glyphRun,
        const TGrafBundle& bundle,
        const TGrafMatrix& modelMatrix=TGrafMatrix::GetIdentity( )) const;
    void Draw (
        const TGArea& area,
        const TGrafBundle& bundle,
        const TGrafMatrix& modelMatrix=TGrafMatrix::GetIdentity( )) const;
    void Draw (
        const TGImage& image,
        const TGRect& source,
        const TGRect& destination,
        const TGrafBundle& bundle,
        const TGrafMatrix& modelMatrix=TGrafMatrix::GetIdentity( )) const;

These are the 2D Draw calls that take an additional bundle and model matrix. They exist solely for convenience for certain specialized conditions. They call the corresponding TGrafDevice::Render call, passilng in the graphic state and device cache.

The bundle and model matrix are concatenated to the state, as shown at 404 in the TGrafPort object before the appropriate TGrafDevice::Render function is called. The purpose of the bundle and optional matrix is to facilitate concatenation of state that typically changes from geometry to geometry. However, since this concatenation takes place each time it is called, their use is not recommended for cases when a bundle or matrix is shared by multiple geometries.

void Draw (const TGLine3D& line) const;
    void Draw (const TGPolyline3D& polyline) const;
    void Draw (const TGCurve3D& curve) const;
    void Draw (const TGSurface3D& surface) const;
    void Draw (const TGSampledSurface3D& surface) const;
    void Draw (const TGBox3D& box) const;

These are the 3D Draw calls. They exist solely for convenience. They call the corresponding TGrafDevice::Render call, passing in the graphic state and device cache.

Like the 2D calls, the purpose for the large number of disjoint calls is to enforce the rule that only a small, well-defined set of basic 3D geometries is supported by graphics devices.

void Draw (
        const TGLine3D& line,
        const TGrafBundle& bundle,
        const TGrafMatrix3D& matrix=TGrafMatrix3D::GetIdentity( )) const;
    void Draw (
        const TGPolyline3D& polyline,
        const TGrafBundle& bundle,
        const TGrafMatrix3D& matrix=TGrafMatrix3D::GetIdentity( )) const;
    void Draw (
        const TGCurve3D& curve,

```
    const TGrafBundle& bundle,
    const       TGrafMatrix3D&       matrix=
       TGrafMatrix3D::GetIdentity( )) const;
void Draw (
    const TGSurface3D& surface,
    const TGrafBundle& bundle,
    const       TGrafMatrix3D&       matrix=
       TGrafMatrix3D:GetIdentity( )) const;
void Draw (
    const TGSampledSurface3D& surface,
    const TGrafBundle& bundle,
    const       TGrafMatrix3D&       matrix=
       TGrafMatrix3D::GetIdentity( )) const;
void Draw (
    const TGBox3D& box,
    const TGrafBundle& bundle,
    const       TGrafMatrix3D&       matrix=
       TGrafMatrix3D::GetIdentity( )) const;
```

These are the 3D Draw calls that take an additional bundle and 3D model matrix. They exist solely for convenience for certain specialized conditions. They call the corresponding TGrafDevice::Render call, passing in the graphic state and device cache 406. While cache 406 is shown as being within device 408, this is for purposes of illustration only. The cache 406 could actually be anywhere that memory is present, which could be memory separate from the device 408, or even in another device not directly involved with the particular graphic rendering being performed.

The bundle and model matrix are concatenated to the state, as shown at 404, in the TGrafPort object before the appropriate TGrafDevice::Render function is called. The purpose of the bundle and optional matrix is to facilitate concatenation of state that typically changes from geometry to geometry. However, since this concatenation takes place each time it is called, their use is not recommended for cases when a bundle or matrix is shared between multiple geometries.

```
    protected:
       TGrafPort ( );
       TGrafPort (const TGrafPort&);
```

These are the constructors. They are protected because TGrafPort is an abstract base class.

```
    };
```

A. The Device Cache

The device cache 406 can potentially be a large object, so care must be taken to ensure that they don't proliferate throughout the system unexpectedly. There are a couple of approaches for the default behavior:

1. Each GrafPort could have its own device cache, but that would be expensive. There would be many, many caches hanging around. This is not a desirable default behavior.
2. Each TGrafPort object could create its own cache if it's not given one by its parent. By default, this would mean that only the GrafPort at the top of each graphic hierarchy would have a cache. This is probably acceptable default behavior. Is the same root GrafPort is used for a bunch of hierarchies, the hierarchies would automatically share the cache in the root GrafPort. If a cache is wanted in every GrafPort, a GrafPort subclass could be written to implement it.

At times it may be desirable to override the default caching behavior. Views may want to. In the old view system, each view cached a device-dependent region. This was a good optimization, since region creation is quite expensive. In the present system, a view can keep its own device cache (which caches a region as well as other device-dependent objects).

B. Graphic State Concatenation

Figure 5:
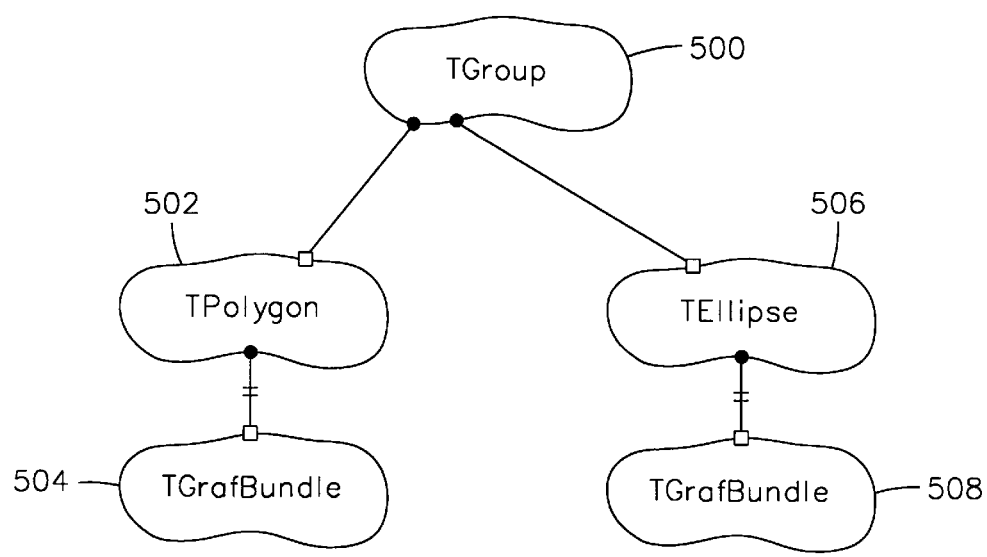
FIG. 5 provides a diagram of a simple hierarchical graphic.

FIG. 5 provides a simple hierarchical graphic. The graphic of FIG. 5 consists of a polygon 502 and an ellipse 506 in a group 500. Each graphic in the hierarchy can store any subset of graphic state. For instance, the polygon and the ellipse each have a TGrafBundle 504 and 508, respectively, while the TGroup stores no graphic state.

This all sounds very simple until hierarchical state such as matrices are considered. To produce the correct local-to-global matrix, a graphic's local matrix must be concatenated with the local-to-global matrix of its parent. This concatenated matrix may then be cached by the graphic that provided it. The present architecture provides for this type of behavior.

The graphic's state must be "concatenated" to that of its parent graphic, producing a new, full set of state that applies to the graphic. When TGroup::Draw is called, its parent's TGrafPort object is passed in. Since the TGroup 500 has no state of its own, it doesn't perform any concatenation. It simply passes its parent's TGrafPort object to the polygon's Draw call and then to the ellipse's Draw call.

The polygon 502 has a TGrafBundle 504 object that must be concatenated to its parent's TGrafPort object. It does this by creating a "linked" TGrafPort subclass (TLinkedBundlePort) that can perform this concatenation. It then makes a call to TLinkedBundlePort::Draw (const TGPolygon&).

Figure 6:
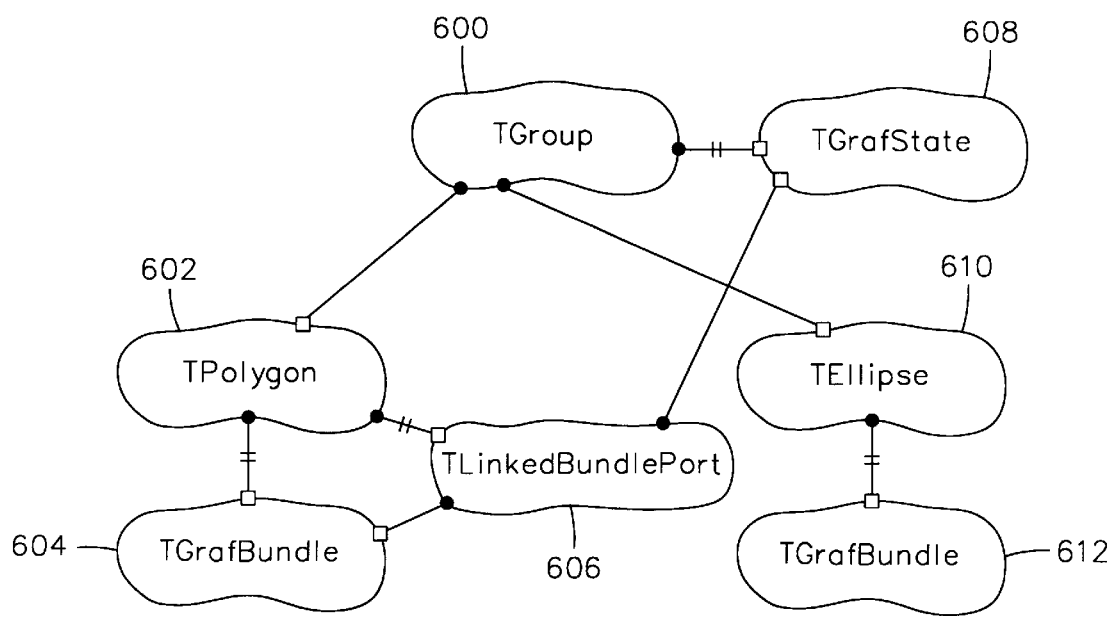
FIG. 6 shows the objects that exist inside the TPolygon's Draw call.

FIG. 6 shows the objects that exist inside the TPolygon's Draw call. Elements 600, 602, 604, 610 and 612 have corresponding elements already discussed with respect to FIG. 5. The discussion will not be repeated here. FIG. 6 also includes TGrafState 608. Because the TLinkedBundlePort object 606 is created locally to TPolygon's 602 Draw call, this type of concatenation is transient in nature. This is necessary for some types of graphic hierarchies. For instance, a graphic hierarchy that allows a particular graphic to be shared in by two or more other graphics must implement transient concatenation because the shared graphic has multiple parents.

Figure 7:
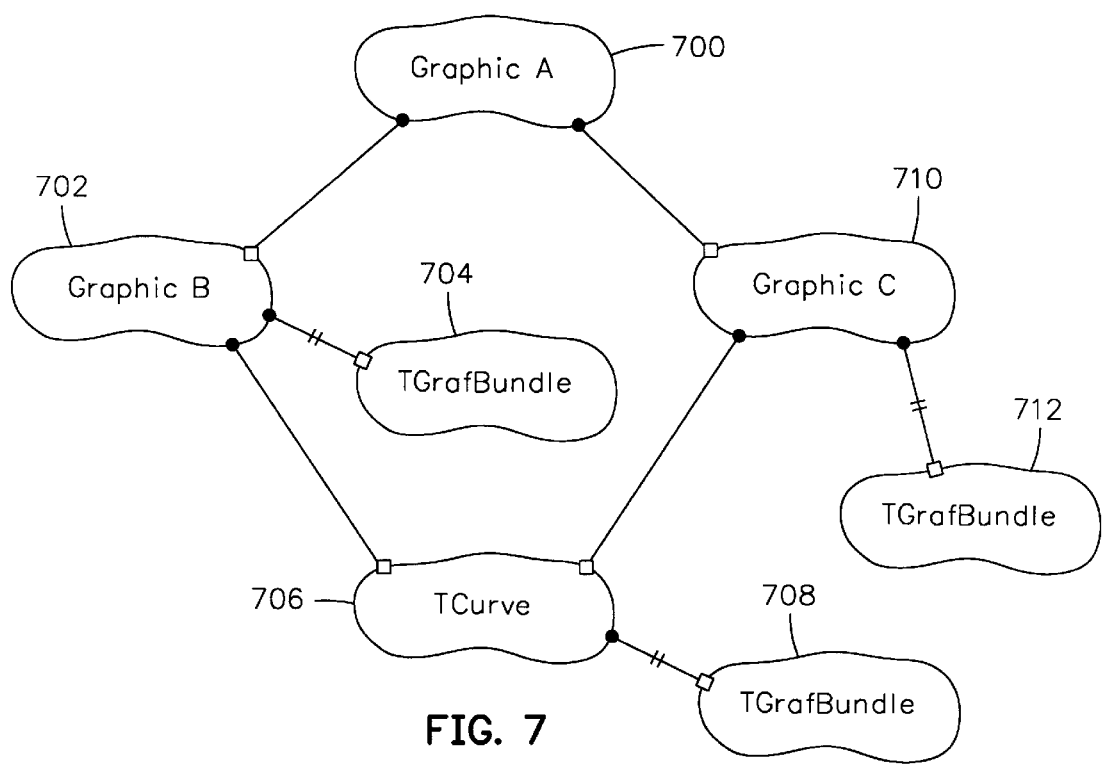
FIG. 7 shows a transient hierarchy.

For example, in FIG. 7, the curve 706 is shared by graphics B 702 and C 710. Each of Graphic B 702, Graphic C 710 and TCurve 706 have respectively associated TGraffundles 704, 712 and 708. From Graphic A 700, a branch could be taken to either Graphic B 702 or Graphic C 710. The concatenation must be transient because the results of the concatenation will be different depending on the branch taken (B or C). That is how a transient hierarchy works.

Graphic objects in a persistent hierarchy require knowledge of parental information, which allows a graphic to be drawn using its parent's state without its parents actually being drawn. An example of such a graphic hierarchy is the view system.

A few things can be said about a persistent hierarchy:

1. A graphic in the hierarchy cannot be shared by multiple parents.
2. Extra semantics, such as LinkTo and Unlink calls and a Draw call with no parameters, must be added to the graphic classes used in the hierarchy.
3. It may use a TGrafPort subclass that stores more private sub-state objects, such as a 2D view matrix state and clip state object. Thus, each graphic may also want to keep its own private device cache.
4. If it needs to be multitask-safe, it will implement it.

Efficiency

It is important to address efficiency because of the large number of graphic state objects that will be floating around the system. There are two concerns:

1. Simple MGraphics should contain only "deltas," or modifications, of their parent's state. For instance, a TPolygon object should contain only a TGrafBundle object.
2. Some state values may be shared by multiple graphics.

The first concern is addressed by the abstract nature of this architecture, which allows different TGrafPort subclasses to contain only the parts they need. The second concern is address by making use of shared attributes.

Sub-States

The following classes are the "sub-state" classes that are accessed through the TGrafPort class. They provide access to the actual graphic state variables. Like TGrafPort, most of them are abstract classes that define only the "getters". Subclasses will provide the implementation of how the state variables are "gotten."

The sub-state classes have different semantics for concatenating with a parent. The LinkTo function provides a temporary connection from the child object to its parent so that concatenation can take place. The Unlink function severs this connection. There are two reasons for using these semantics:

1. Concatenated values can be cached in the child.
2. The child-to-parent connection may need to be persistent, rather than the more typical transient case.

For more information about LinkTo and Unlink, see the Using LinkTo and Unlink section below. The sub-states are shown below.

A. TAttributeState

The TAttributeState class contains information about the appearance of graphics when they are drawn.
The class definition is shown below:

```
class TAttributeState {
public:
    virtual const TPaint* GetFillPaint ( )=0;
    virtual const TPaint* GetFramePaint ( )=0;
    . . .
};
```

B. TMatrixState

The TMatrixState class defines a 2D coordinate system. TMatrixState contains protocol to access the matrix that transforms from the local coordinate system to some global coordinate system (typically the world coordinate system).

The TLinkableMatrixState class defines protocol to support linking, or concatenating, with another TMatrixState object. This linking behavior is in a subclass for two reasons: 1) it isn't needed by clients that access the matrix (such as TGrafDevice), and 2) different linking interfaces may be used by advanced clients.
The class definitions are shown below:

```
class TMatrixState {
public:
    virtual const TGrafMatrix* GetMatrix ( )=0;
};

class TLinkableMatrixState: public TMatrixState {
public:
    virtual void LinkTo (const TMatrixState * parent)=0
    virtual void Unlink ( )=0;
        The LinkTo and Unlink calls give the TLinkableMa-
        trixState object transient access to its parent so that
        concatenation of matrices can take place. LinkTo is
        called to establish the connection with its parent;
        Unlink is called to sever the connection.
};
```

C. TClipState

The TClipState class defines a shape or boundary to clip to. It contains protocol to access the clip area, which is used by a device during rendering.

The ThinkableClipState class defines protocol to support linking, or concatenating, with another TClipState object. This linking behavior is in a subclass for two reasons: 1) it isn't needed by clients that access the clip area (such as TGrafDevice), and 2) different linking interfaces may be used by advanced clients.
The class definitions are shown below:

```
class TClipState {
public:
    virtual const TGArea* GetClipArea ( )=0;
};

class ThinkableClipState : public TClipState {
public:
    virtual void LinkTo (const TClipState * parent, const
        TMatrixState*
    parentCoordSystem)=0;
    virtual void Unlink ( )=0;
        The LinkTo and Unlink calls give the TClipState
        object transient access to its parent so that concat-
        enation of clip areas can take place. LinkTo is called
        to establish the connection with its parent; Unlink is
        called to sever the connection.
};
```

D. TSceneState

The TSceneState class contains information about the scene as a whole. This information is normally specified only once per scene. It contains the following members:
    Lights
    Camera
The class definition is shown below:

```
class TSceneState {
public:
    virtual TIterator* CreateLightIterator ( )=0;
    virtual const TCamera* GetCamera ( )=0;
    . . .
};
```

E. TMatrix3DState

The TMatrix3DState class defines a 3D coordinate system. TMatrix3DState contains protocol to access the matrix that transforms from the local coordinate system to some global 3D coordinate system (typically the 3D world coordinate system).

The TLinkableMatrix3DState class defines protocol to support linking, or concatenating, with another TMatrix3DState object. This linking behavior is in a subclass for two reasons: 1) it isn't needed by clients that access the matrix (such as TGrafDevice), and 2) different linking interfaces may be used by advanced clients.
The class definitions are shown below:

```
class TMatrix3DState {
public:
    virtual const TGrafMatrix3D* GetMatrix ( )=0;
};

class TLinkableMatrix3DState : public TMatrix3DState {
public:
    virtual void LinkTo (const TMatrix3DState * parent)=
        0;
    virtual void Unlink ( )=0;
        The LinkTo and Unlink calls give the
        TLinkableMatrix3DState object transient access to
``` its parent so that concatenation of matrices can take place. LinkTo is called to establish the connection with its parent; Unlink is called to sever the connection.

};

F. Using LinkTo and Unlink

The LinkTo and Unlink functions are typically called only from within a "linked" TGrafPort object, so you will almost never need to call them directly. Calling them directly results in exception-hostile code: If an exception is thrown between a LinkTo call and the Unlink call, the Unlink call is never made. Bad news.

The good news is that if they need to be called directly in your code, you can either use the supplied TGrafPort subclasses, or you can subclass TGrafPort yourself if you need some specialized behavior. Like the other linked port classes, you should call the LinkTo function in the constructor and the Unlink function in the destructor.

System-Supplied Subclasses

The present graphics system will provide several useful subclasses of the graphic state classes. Some are described below.

A. TGrafPort Subclasses

Figure 8:
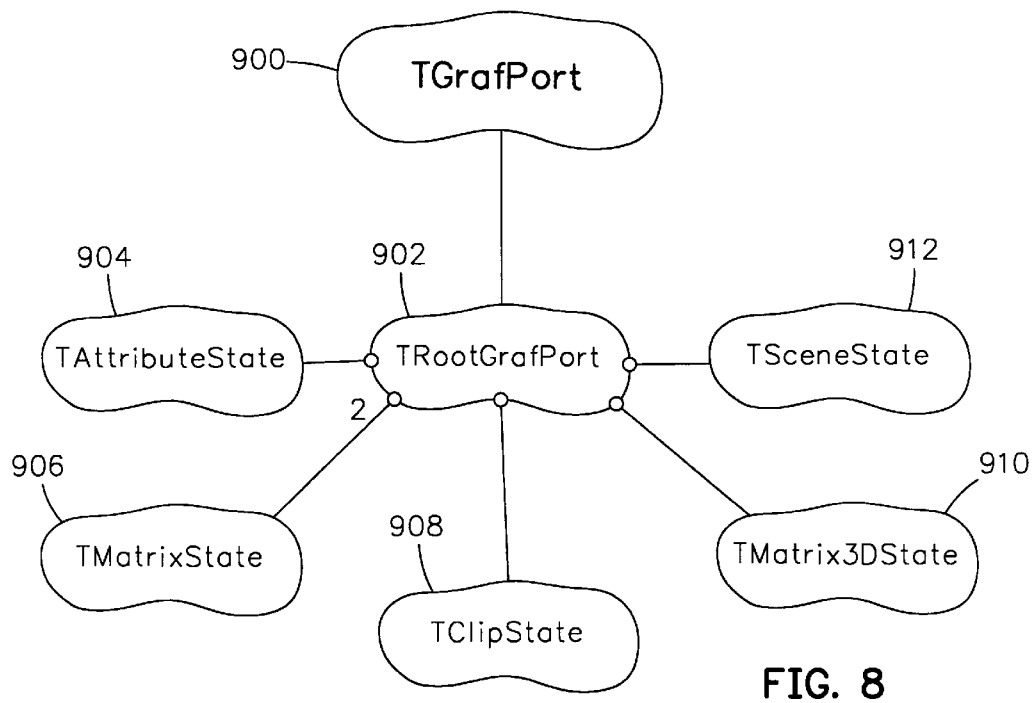
FIG. 8 is a diagram showing the TRootGrafPort class which contains default values for every sub-state.

As shown in FIG. 8, the TRootGrafPort class 902 contains default values for every sub-state 904–912. All sub-states reach TGrafPort 900 via TRootGrafPort 902. Thus, it represents the World Coordinate space with an infinite clip area. It has a pointer to a TGrafDevice object, and it owns a device cache that it gets from the device. Use of this class should be by clients drawing off-screen only; on-screen use will result in drawing over the entire screen.

Figure 9:
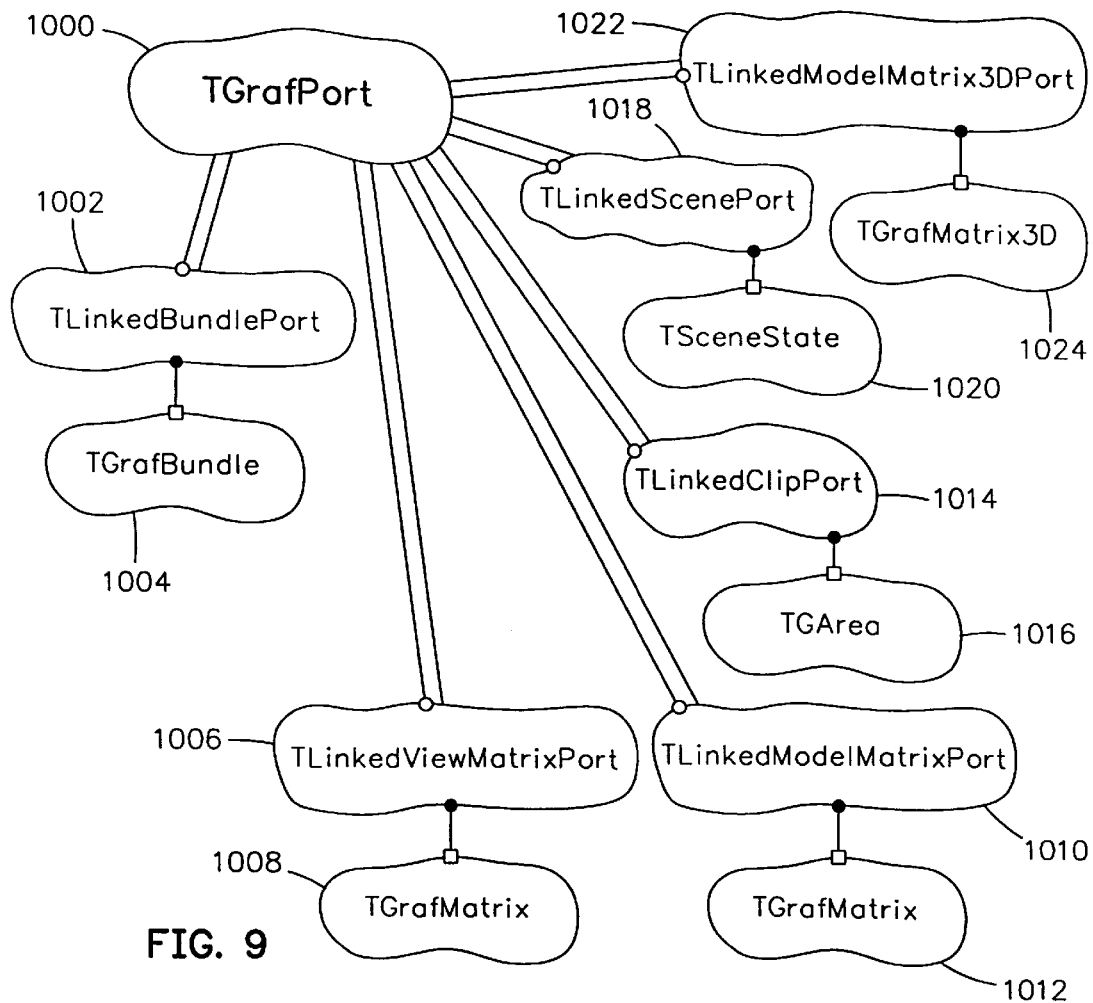
FIG. 9 is a diagram showing the TLinkedBundlePort class which serves as the concatenation of a "parent" TGrafPort object and a TGrafBundle object.

As shown in FIG. 9, the TLinkedBundlePort class 1002 serves as the concatenation of a "parent" TGrafPort object 1000 and a TGrafBundle object 1004. It is used when a local bundle needs to be concatenated to the attribute state object in the parent TGrafPort object 1000. The rest of the parent's state is inherited.

The TLinkedViewMatrixPort class 1006 serves as the concatenation of a parent TGrafPort object 1000 and a specified view matrix 1008. It is used when a local view coordinate system is desired. It concatenates the specified matrix to the view matrix in the parent TGrafPort object 1000. The rest of the parent's state is inherited. Alternatively, a matrix state object can be passed in instead of a matrix, if caching of the concatenated matrix is desired.

The TLinkedModelMatrixPort class 1010 serves as the concatenation of a parent TGrafPort object 1000 and a specified model matrix 1012. It is used when a local model coordinate system is desired. It concatenates the specified matrix to the model matrix in the parent TGrafPort object 1000. The rest of the parent's state is inherited. Alternatively, a matrix state object can be passed in instead of a matrix, if caching of the concatenated matrix is desired.

The TLinkedClipAreaPort class 1014 serves as the concatenation of a parent TGrafPort object 1000 and a TGArea 1016. It is used when a local clip area needs to be intersected with the clip area in the parent TGrafPort object 1000. The rest of the parent's state is inherited. Alternatively, a clip state object can be passed in instead of a clip area, if caching of the concatenated clip area is desired.

The TLinkedScenePort class 1018 serves as the concatenation of a parent TGrafPort object 1000 and a TSceneState object 1020. It is used when a local scene state needs to be concatenated to the scene state in the parent TGrafPort object. The rest of the parent's state is inherited.

The TLinkedModelMatrix3DPort class 1022 serves as the concatenation of a parent TGraflort object 1000 and a specified 3D model matrix 1024. It is used when a local 3D model coordinate system is desired. It concatenates the specified matrix to the 3D model matrix in the parent TGrafPort object. The rest of the parent's state is inherited. Alternatively, a matrix state object can be passed in instead of a matrix, if caching of the concatenated matrix is desired.

B. TAttributeState Subclasses

These subclasses may include virtually any appearance attribute of a graphic processing system.

C. TMatrixState Subclasses

Figure 10:
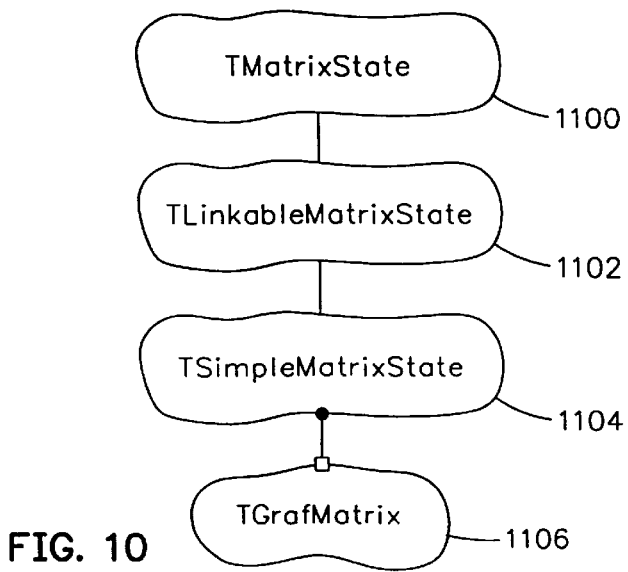
FIG. 10 is a diagram demonstrating the relationships of the TSimpleMatrixState class.

As shown in FIG. 10, the TSimpleMatrixState class 1104 contains a local 2D matrix 1106. Its local matrix is concatenated with the local-to-global matrix of its parent via 1102, producing its own local-to-global matrix 1100, which is returned by GetMatrix.

D. TClipState Subclasses

Figure 11:
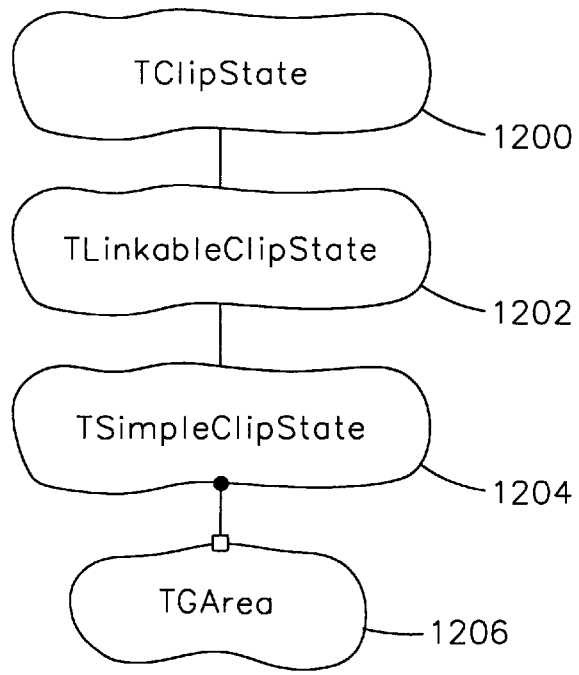
FIG. 11 is a diagram showing the relationship of TClipState subclasses.

FIG. 11 is a diagram showing the relationship of TClipState subclasses 1200. The TSimpleClipState class 1204 contains a single TGArea object 1206 as its local clip area. Its local clip area is intersected with its parent's clip area, producing the clip area that is returned by GetClipArea. GetClipAreaWithChildren returns the same clip area.

The view system will define a more sophisticated TLinkableClipState subclass 1202 that incorporates its children's clip areas into the equation. It subtracts its children's clip areas from its own, producing a new clip area that is returned by GetClipArea. See the view system documentation for more information.

E. TSceneState Subclasses

The TSceneState subclasses include information about the scene as a whole. For example, the subclasses may include lights and camera.

F. TMatrix3DState Subclasses

Figure 12:
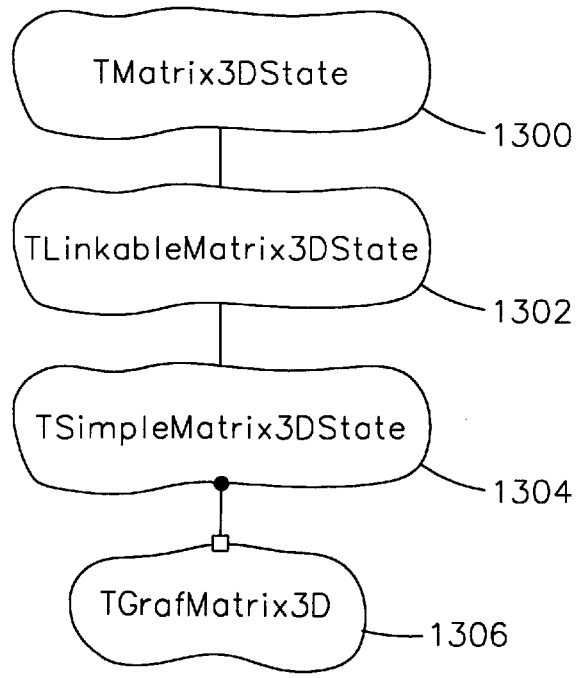
FIG. 12 is a diagram showing the relationships established for TMatrix3DState.

FIG. 12 is a diagram showing the relationships established for TMatrix3DState 1300. The TSimpleMatrix3DState class 1304 contains a local 3D matrix 1306. Its local matrix is concatenated with the local-to-global matrix of its parent, producing its own local-to-global matrix, which is returned by GetMatrix. TLinkableMatrix3DState 1302 provides the mechanism for linking TSimpleMatrix3DState 1304 and TMatrix3DState 1300.

Usage by MGraphic

In order to support MGraphic hierarchies, the parent's state must be passed into the MGraphic::Draw call so that the child can concatenate its state with it.

void Draw (TGrafPort& parentPort);

MGraphic subclasses that need more specialized behavior (i.e., views) will have to define extra semantics to support it.

Examples of Usage

A. Graphic Hierarchies

Figure 13:
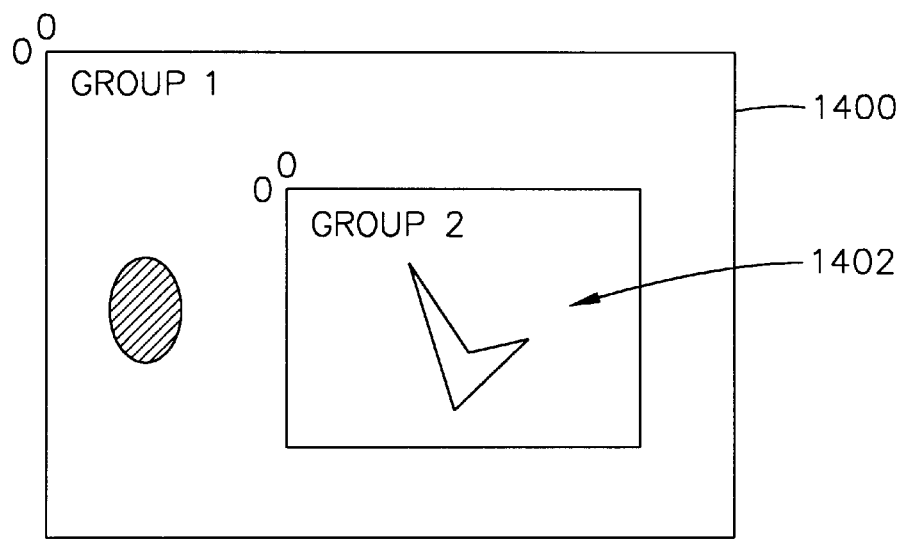
FIG. 13 is an example of a graphic hierarchy.

When a particular matrix state object is asked, "Give me your local-to-global model matrix," the answer sometimes depends on the local-to-global model matrix of the parent state. Consider the graphic hierarchy of FIG. 13. This graphic consists of two small groups of graphics, group 1, indicated by 1400, and group 2, indicated by 1402. Group 2, which contains a polygon, resides inside group 1, which also contains an ellipse. Both groups contain a TSimpleMatrixState object that defines their model coordinate systems.

Group 1 represents the screen, meaning that its parent matrix is identity. When asked, "Give me your local-to-global model matrix," group 1 simply returns its own local matrix. When group 2 is asked the same question, it must preconcatenate its own local model matrix with the localto-global model matrix of group 1 and return the result. It will probably cache the result.

B. Concrete Examples

Different subclasses of the above abstract classes implement specialized behaviors. Specialized behavior may include:

1. Different concatenation behavior of the hierarchical state variables, such as clip area calculation.
2. Different override behavior of the non-hierarchical variables, such as antialiasing control.
3. Different storage requirements. Most only need to store a subset of the state.

1. Simple MGraphics (TPolygon)

Simple MGraphics such as TPolygon need only specify the attributes contained in the TGrafBundle class (draw operation, fill and frame paints, etc.). The Draw call of TPolygon is shown below.

TPolygon::Draw (const TGrafPort& parentPort)
{
    parentPort.Draw (*this, *fBundle); // override the parent's attribute state
}

Notice that it uses the overriding bundle parameter of the TGrafPort::Draw call.

2. More Complex MGraphics

Some MGraphics require more state than just a TGrafBundle object. Shown below is the Draw call of a graphic that stores a TGrafBundle and a local model matrix
TGraphicWithABunchOfState::Draw (const TGrafPort& parent)
{
    TLinkedBundlePort bundlePort (&parent, fBundle);
    TLinkedModelCoordinatePort coordinateport (&bundlePort, fMatrixState);
    coordinatePort.Draw (fPolygon);
    coordinatePort.Draw (fEllipse);
    bundlePort.Draw (fCurve); // Use the overridden bundle but draw in the
    // parent's coordinate system
}

3. Drawing Directly to the Screen

Drawing directly to the screen is done like this:
{
    // Drawing geometries directly to the screen in different colors
    // This GrafPort contains a device cache and default values for all
    //graphic state TRootGrafPort rootport (GetDesktopDevice( ));
    // rootPort.Draw (myRect, redBundle);
    //rootPort.Draw (myCurve, greenBundle, curveMatrix);
    //rootPort.Draw (myArea);
}

4. Drawing Directly to the Screen With Clip Boundaries

Drawing directly to the screen using nested clip boundaries and coordinate systems is performed like this:
{
    // Drawing geometries to the screen using a different coordinate //system and clip state
    // This GrafPort contains a device cache and default values for all graphic state TRootGrafPort rootPort (GetDesktopDevice( ));
    // This GrafPort has its own clip state; rootPort is its parent TLinkedClipPort clippedPort (rootPort, myClipState);
    clippedPort.Draw (myRect, yellowBundle);
    rootPort.Draw (myLoop, weirdBundle, someMatrix);
    clippedPort.Draw (myEllipse);
    // You can draw MGraphics, too! myGraphic.Draw (rootPort);
    myOtherGraphic.Draw (clippedPort);
}

5. Drawing a Back-Buffered Graphic

A back-buffering graphic owns a device that acts as a "cache" of its children. For instance, for a frame buffer, the back-buffer would be a TGImage. When concatenation with the parent occurs, the back-buffer is validated with respect to the device that is passed in. If it's a valid back-buffer for the passed-in device, then it is drawn to the device. Otherwise, it is deleted and replaced with a new back-buffer. This behavior is wrapped up in the TLinkedBackBufferGrafPort class. The following is one of several ways this feature could be implemented. TBackBufferingGraphic::Draw (const TGrafPort& parentPort)
{
    TLinkedBackBufferPort port (parentPort, fPort);
    if (port.IsOutOfDate( ))
        fGraphic->Draw (port); // draw the contained MGraphic
    // TBackBufferPort copies the back buffer to the device
}

Notice that the TBackBufferingGraphic class can act as a "wrapper" for another MGraphic that knows nothing about back-buffering.

C. Example

Figure 14:
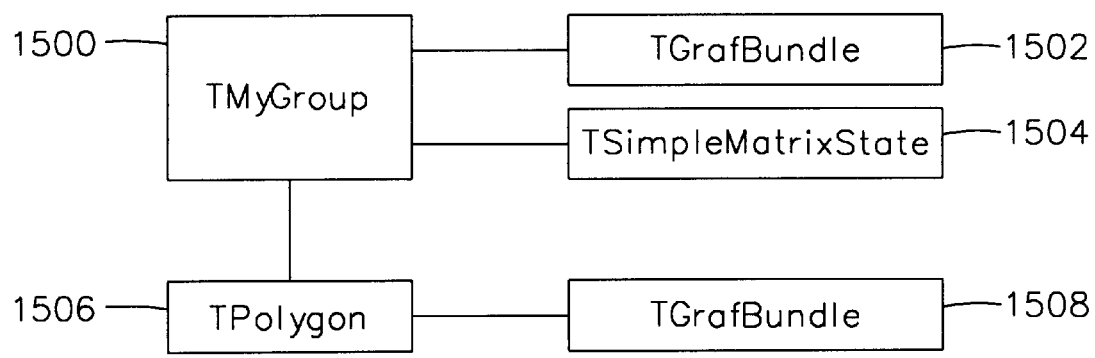
FIG. 14 is a diagram of an MGraphic.

Coinsider the FIG. 14 MGraphic. It consists of a single TGroup 1500 that contains a single TPolygon 1506. They both contain some local state. TMyGroup 1500 contains local state TGrafBundle 1502 and TSimpleMatrixState 1504. TPolygon 1506 contains local state TGrafBundle 1508.

Figure 15:
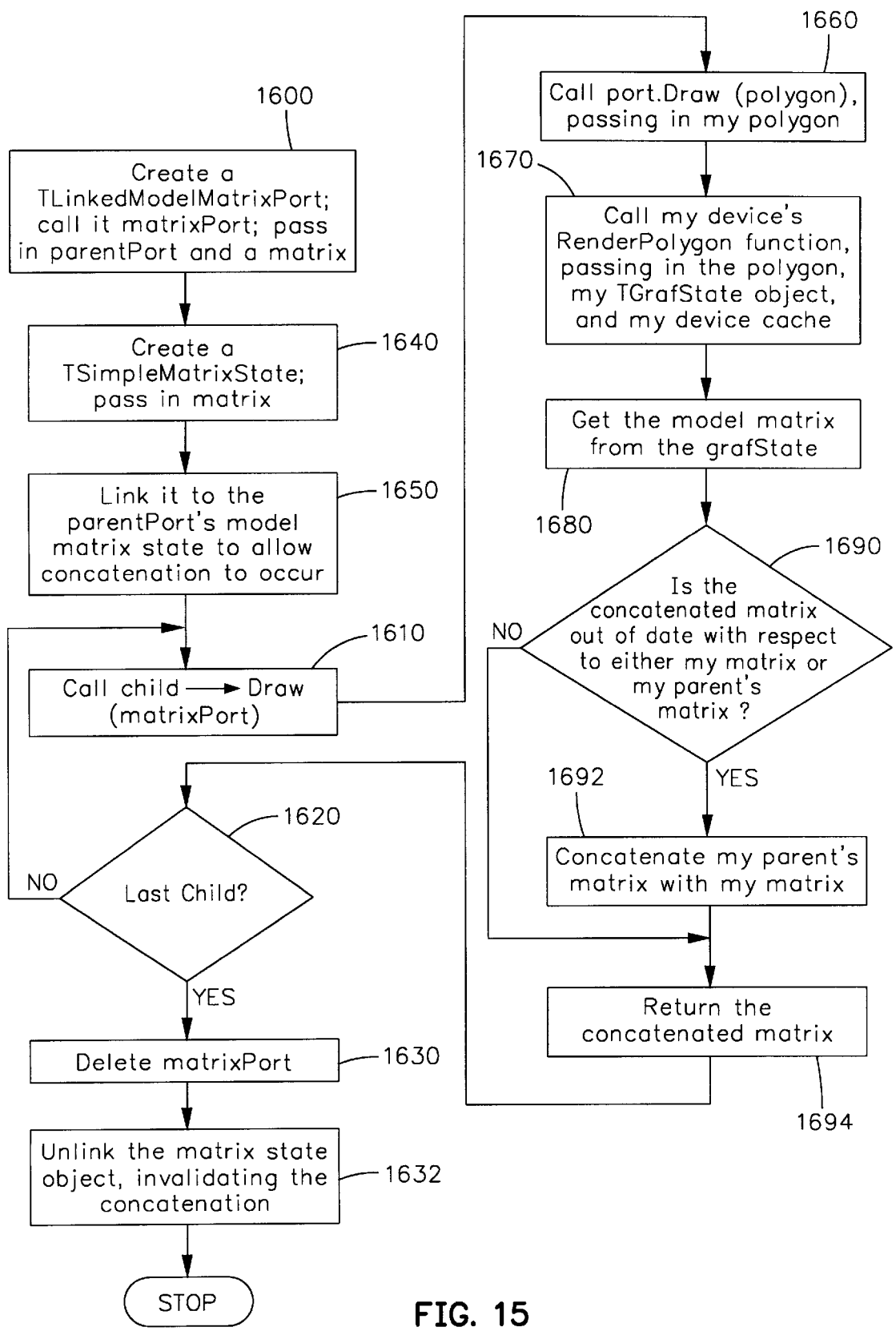
FIG. 15 is a flowchart of an example of what may happen when a call to TMyGroup::Draw is made.

FIG. 15 is a flowchart of the detailed logic in accordance with a preferred embodiment. Processing commences at function block 1600 where a grafport is created which concatenates a matrix using the logic in function blocks 1640 and 1650 where a matrix state object is created and linked to the parent port's matrix state object to facilitate the concatenation. Then, at function block 1610, a loop is commenced to draw into the port that was just created. This is accomplished by passing a polygon or other geometry to the grafport at function block 1660, the grafport in turn passes the polygon or other geometry and its graphic state object at function block 1670 to the graphic device. Then, at function block 1680, the device obtains a matrix from the graphic state object that was passed to it. Then, a test is performed at decision block 1690 to determine if the concatenated matrix is out of date with respect to the parent matrix and the local matrix. If it is out of date, then the parent matrix and the local matrix are concatenated at function 1692 and the result is returned to the graphic device at function block 1694.

The loop commenced at function block 1610 involves a test at decision block 1620 to determine if the last graphic object has been processed. If so, then the grafport created at function block 1600 is deleted in function block 1630 and the grafport's matrix state is unlinked from the parent at function block 1632.

While the invention has been described in terms of a preferred embodiment, those skilled in the art will recognize that the invention can be practiced with modification within the spirit and scope of the appended claims.

Having thus described our invention, what we claim as new, and desire to secure by Letters Patent is:

1. An apparatus for drawing a plurality of graphic images on a graphic device, the apparatus comprising:
   (a) processor means;
   (b) storage means attached to the processor means;
   (c) a graphic device under the control of the processor means;
   (d) a plurality of graphic objects in the storage means, the plurality of graphic objects being arranged in a hierarchy, each graphic object comprising data and a member function for drawing an associated one of the plurality of graphic images on the graphic device means;
   (e) a graphic state object in the storage means associated with each graphic object, the graphic state object containing data needed to draw the associated one graphic image; and
   (f) application means for arranging the graphic state objects into a sequence and for processing the sequence of graphic state objects to draw one of the plurality of graphic images on the graphic device.

2. The apparatus as recited in claim 1 wherein the graphic state object data comprises a graphic state having a plurality of sub-states in the graphic state, each of the plurality of sub-states including a piece of information used to draw the associated one graphic image.

3. The apparatus as recited in claim 2, including appearance rendering means in a sub-state of the graphic state.

4. The apparatus as recited in claim 2, including coordinate means in a sub-state of the graphic state.

5. The apparatus as recited in claim 2, including clipping means in a sub-state of the graphic state.

6. The apparatus as recited in claim 2, including scene means in a sub-state of the graphic state.

7. The apparatus as recited in claim 1, including a communication means for communicating information pertaining to a set of devices attached to the apparatus.

8. The apparatus as recited in claim 1, including cache means for storing graphic information.

9. The apparatus as recited in claim 1, including:
   (a) storage means for receiving drawing functions from the application means;
   (b) storage means for receiving graphic state information; and
   (c) means for sending the drawing functions and the graphic state information to the set of devices attached to the apparatus.

10. The apparatus as recited in claim 9, including means for caching information.

11. The apparatus as recited in claim 9, wherein the graphic device is a display.

12. The apparatus as recited in claim 1, including means for performing concatenation of graphic state objects.

13. The apparatus as recited in claim 9, wherein the graphic device is a printer.

14. The apparatus as recited in claim 9, wherein the graphic device is a plotter.

15. A method for drawing a plurality of graphic images using a processor with an attached storage and display, comprising the steps of:
   (a) building, in storage, graphic state objects, each with a graphic state;
   (b) associating each graphic state object with a graphic object from a hierarchy of graphic objects, in the storage, wherein each graphic object comprises data and a member function for drawing an associated one of the plurality of graphic images and wherein each graphic state object contains data needed to draw the associated one graphic image;
   (c) arranging the graphic state objects into a sequence; and
   (d) processing the sequence of graphic state objects resident in the storage to display one of the plurality of graphic images on the display.

16. The method as recited in claim 15, including the step of storing a plurality of sub-states in the graphic state.

17. The method as recited in claim 16, including the step of performing appearance rendering based on a sub-state of the graphic state.

18. The method as recited in claim 16, including the step of performing coordinate processing based on information in a sub-state of the graphic state.

19. The method as recited in claim 16, including the step of performing clipping on the graphic based on information in a sub-state of the graphic state.

20. The method as recited in claim 16, including the step of performing scene rendering based on information stored in a sub-state of the graphic state.

21. The method as recited in claim 15, including the step of communicating information pertaining to a set of devices.

22. The method as recited in claim 15, including the step of storing graphic information in a cache.

23. The method as recited in claim 15, including the steps of:
   (a) receiving drawing functions from an application;
   (b) receiving graphic state information; and
   (c) sending the drawing functions and the graphic state to a set of devices.

24. The method as recited in claim 23, including the step of sending the graphic state to the cache means.

25. The method as recited in claim 23, including the step of sending specialized conditions to the set of devices attached to the method.

26. The method as recited in claim 15, including the step of performing concatenation of graphic state objects.

27. In a computer system having a display and means responsive to a draw command for using a first graphical object to draw a first image on the display and means responsive to the draw command for using a second graphical object to draw a second image on the display, the first image being related to the second image on the display, a graphic state system for storing and accessing graphical state information, comprising:
   first means responsive to the first graphical object for creating a first graphical state object containing information for drawing the first image on the display;
   second means responsive to the second graphical object for creating a second graphical state object containing information for drawing the second image on the display; and
   means responsive to the draw command for concatenating the second graphical state object with the first graphical state object to allow the computer system to draw the second image without accessing the first graphical object.

28. The graphic state system of claim 27 wherein the second creating means includes means for creating a graphical state object containing data controlling an appearance of a graphical image on the display.

29. The graphic state system of claim 28 wherein the second creating means includes means for creating a graphical state object including matrix information for transforming a graphical image from a local coordinate system to a global coordinate system.

30. The graphic state system of claim 29 wherein the second creating means includes means for creating a graphical state object including clipping state information, defining a clipping boundary for a graphical image.

31. The graphic state system of claim 30 wherein the second creating means includes means for creating a graphical state object including scene information, lighting information and camera placement information.

32. The graphic state system of claim 31 wherein the second creating means includes means for creating a graphical state object having three-D matrix information for transforming a graphical image from a local coordinate system to a global three-D coordinate system.

33. The graphic state system of claim 27 wherein the second creating means further comprises means for providing a reference attribute within the second graphical object that refers to the second graphical state object.

34. The graphic state system of claim 27 wherein the concatenating means includes means responsive to the draw command for creating a linked port object having a first reference attribute for referring to the first graphical state object and having a second reference attribute for referring to the second graphical state object and wherein the concatenating means includes means for creating a third reference attribute within the second graphical object for referring to the linked port object.

35. The graphic state system of claim 34 wherein first creating means creates the first graphical state object from a first class and creates the second graphical state object from a second class and the concatenating means further includes:
   means for creating a first linkable graphical state object from a first subclass of the first class; and
   means for creating a second linkable graphical state object from a second subclass of the second class, the second subclass including a linking member function to link the linked port object with the first linkable graphical state object and with the second linkable graphical state object.

36. The graphic state system of claim 27 further including means for creating a graphical port object for association with a task of the computer system, the graphical port object having means for accessing at a first and second graphical state objects.

37. The computer system of claim 27 further comprising:
   a graphical device rendering system for rendering graphical display items described by graphical objects;
   means responsive to the draw command for providing a graphical object and for providing a graphical state object to the graphical device rendering system so that the rendering system may render a graphical display item.

38. In a computer system having a display and means responsive to a draw command for using a first graphical object to draw a first image on the display and means responsive to the draw command for using a second graphical object to draw a second image on the display, the first image being related to the second image on the display, a method for storing and accessing graphical state information, the method comprising the steps of:
   A. creating a first graphical state object containing information for drawing the first image on the display;
   B. creating a second graphical state object containing information for drawing the second image on the display; and
   C. concatenating the second graphical state object with the first graphical state object to allow the computer system to draw the second image without accessing the first graphical object.

39. The method of claim 38 wherein step A includes the step of:
   A1. creating a first graphical state object containing information indicative of an appearance of the first image.

40. The method of claim 38 wherein step A includes the step of:
   A2. creating a first graphical state object containing matrix information for transforming the first graphical image from a local coordinate system to a global coordinate system.

41. The method of claim 38 wherein step A includes the step of:
   A3. creating a first graphical state object containing clipping state information, defining a clipping boundary for the first graphical image.

42. The method of claim 41 wherein step A includes the step of:
   A4. creating a first graphical state object containing scene information, lighting information and camera information.

43. The method of claim 42 wherein step A includes the step of:
   A5. creating a first graphical state object containing three-D matrix information for transforming a the first graphical image from a local coordinate system to a global three-D coordinate system.

44. The method of claim 38 wherein step B includes the step of:
   B1. providing a reference attribute within the second graphical object that refers to the second graphical state object.

45. The method of claim 38 wherein step C includes the steps of:
   C1. creating a linked port object having a first reference attribute for referring to the first graphical state object and having a second reference attribute for referring to the second graphical state object; and
   C2. creating a third reference attribute within the second graphical object for referring to the linked port object.

46. The method of claim 45 wherein the first graphical object is created from a first class and the second graphical object is created from a second class and wherein step C includes the steps of:
   C3. creating a first linkable graphical state object from a first subclass of the first class, and
   C4. creating a second linkable graphical state object from a second subclass derived from the second class, the second subclass including a linking member function to link the linked port object with the first linkable graphical state object and the second linkable graphical state object.

47. The method of claim 38 further comprising the steps of:
   D. creating a graphical port object;
   E. associating the graphical port object with a task of the computer system, and
   F. using the graphical port object to access the first and second graphical state objects.

\* \* \* \* \*